(12) United States Patent
Yoon

(10) Patent No.: US 10,305,074 B2
(45) Date of Patent: May 28, 2019

(54) BATTERY ASSEMBLY

(71) Applicant: SAMSUNG SDI CO., LTD., Yongin-si, Gyeonggi-do (KR)

(72) Inventor: Jong Wook Yoon, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 130 days.

(21) Appl. No.: 15/410,533

(22) Filed: Jan. 19, 2017

(65) Prior Publication Data
US 2017/0214014 A1 Jul. 27, 2017

(30) Foreign Application Priority Data

Jan. 26, 2016 (KR) ........................ 10-2016-0009412

(51) Int. Cl.
H01M 2/00 (2006.01)
H01M 2/10 (2006.01)
H01M 2/20 (2006.01)
(52) U.S. Cl.
CPC ......... H01M 2/1077 (2013.01); H01M 2/206 (2013.01); H01M 2220/10 (2013.01)
(58) Field of Classification Search
CPC ........................... H01M 2/1077; H01M 2/206; H01M 2220/10
See application file for complete search history.

(56) References Cited

U.S. PATENT DOCUMENTS

2002/0086202 A1 7/2002 Stone et al.
2002/0192543 A1* 12/2002 Heimer ............... H01M 2/0262
429/158
2011/0117420 A1* 5/2011 Kim ..................... B23K 9/0026
429/158

FOREIGN PATENT DOCUMENTS

JP 2010-168768 A 8/2010
JP 2012-190844 A 10/2012
JP 2014-022157 A 2/2014
KR 10-2003-0038773 5/2003

* cited by examiner

Primary Examiner — Cynthia H Kelly
Assistant Examiner — Monique M Wills
(74) Attorney, Agent, or Firm — Lewis Roca Rothgerber Christie LLP

(57) ABSTRACT

A battery assembly includes a rack housing including a front opening portion and a rear opening portion open in opposite directions; and a plurality of battery modules accommodated in the rack housing. The battery assembly includes a dual rack housing capable of accommodating a plurality of battery modules through opposite sides, such as a front surface and a rear surface, and thus, may prevent short circuits when the battery modules accommodated in the rack housing are electrically connected.

20 Claims, 9 Drawing Sheets

BATTERY ASSEMBLY

CROSS-REFERENCE TO RELATED APPLICATION

This application claims priority to and the benefit of Korean Patent Application No. 10-2016-0009412, filed on Jan. 26, 2016 in the Korean Intellectual Property Office, the entire disclosure of which is incorporated herein by reference.

BACKGROUND

1. Field

Aspects of one or more embodiments relate to a battery assembly.

2. Description of the Related Art

As problems such as environmental destruction and resource exhaustion become more severe, interest in a system capable of storing electric power and utilizing the stored electric power effectively has been increasing. Also, interest in renewable energy that does not cause pollution during power generation is also increasing. For example, a power storage apparatus aims to effectively utilize electric power by mutually connecting a renewable energy source, a battery storing electric power, and an existing power grid to one another.

Such a power storage apparatus may also be used as an uninterruptible power supply for providing emergency operating power, and may also provide electric power required by industrial equipment under such circumstances as suspension of a main power source.

SUMMARY

According to an aspect of one or more embodiments, a dual rack housing is capable of accommodating a plurality of battery modules by accommodating the battery modules at opposite sides, e.g., front and rear portions.

According to another aspect of one or more embodiments, a battery assembly is capable of preventing or substantially preventing electric shorts when battery modules accommodated in a rack housing are electrically connected to one another.

Additional aspects will be set forth in part in the description which follows and, in part, will be apparent from the description, or may be learned by practice of the presented embodiments.

According to one or more embodiments, a battery assembly includes: a rack housing including a front opening portion and a rear opening portion open in opposite directions; and a plurality of battery modules accommodated in the rack housing.

Each of the plurality of battery modules may include a first terminal and a second terminal of opposite polarities, and both the first terminal and the second terminal may be arranged at a same portion of the front opening portion or the rear opening portion.

Each of the plurality of battery modules may include a first terminal and a second terminal of opposite polarities, and a bus bar for electrically connecting neighboring battery modules of the plurality of battery modules may be connected to one of the first terminal or the second terminal.

Each of the plurality of battery modules may include a rotation bound device to restrain rotation of the bus bar.

The rotation bound device may be arranged at the same portion of the front opening portion or the rear opening portion, at which the first and second terminals are arranged.

The rotation bound device may include a through hole to receive the bus bar.

In each of the plurality of battery modules, the first terminal and the second terminal may be arranged at an upper portion, and the rotation bound device may be arranged at a lower portion.

The bus bar may extend in a direction in which battery modules of the plurality of battery modules are stacked.

The rack housing may include: a first rack housing accommodating battery modules of a first group of the plurality of battery modules; and a second rack housing accommodating battery modules of a second group of the plurality of battery modules.

The first rack housing may accommodate the battery modules of the first group through the front opening portion, and the second rack housing may accommodate the battery modules of the second group through the rear opening portion.

The first rack housing and the second rack housing may be integrally formed with each other.

The rack housing may include: a frame; and a partition device partitioning the frame in a backward and forward direction.

The partition device may restrict assembling locations of the battery modules of the first group and the battery modules of the second group, the battery modules of the first group and the battery modules of the second group being assembled respectively through the front opening portion and the rear opening portion.

The rack housing may further include rack shelves within the frame to support the plurality of battery modules.

Each of the plurality of battery modules may include a plurality of battery cells.

Each of the plurality of battery modules may include a first terminal and a second terminal having opposite polarities from each other, and each of the plurality of battery cells may include a first electrode and a second electrode having opposite polarities from each other, and a terminal line connecting the first and second terminals to each other and an electrode line connecting the first and second electrodes to each other extend to cross each other.

In each of the plurality of battery modules, both the first terminal and the second terminal may be arranged at a same portion of the front opening portion or the rear opening portion.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Herein, a battery assembly according to one or more embodiments will be described with reference to the accompanying drawings. As used herein, the term "and/or" includes any and all combinations of one or more of the associated listed items. Expressions such as "at least one of," when preceding a list of elements, modify the entire list of elements and do not modify the individual elements of the list.

Figure 1:
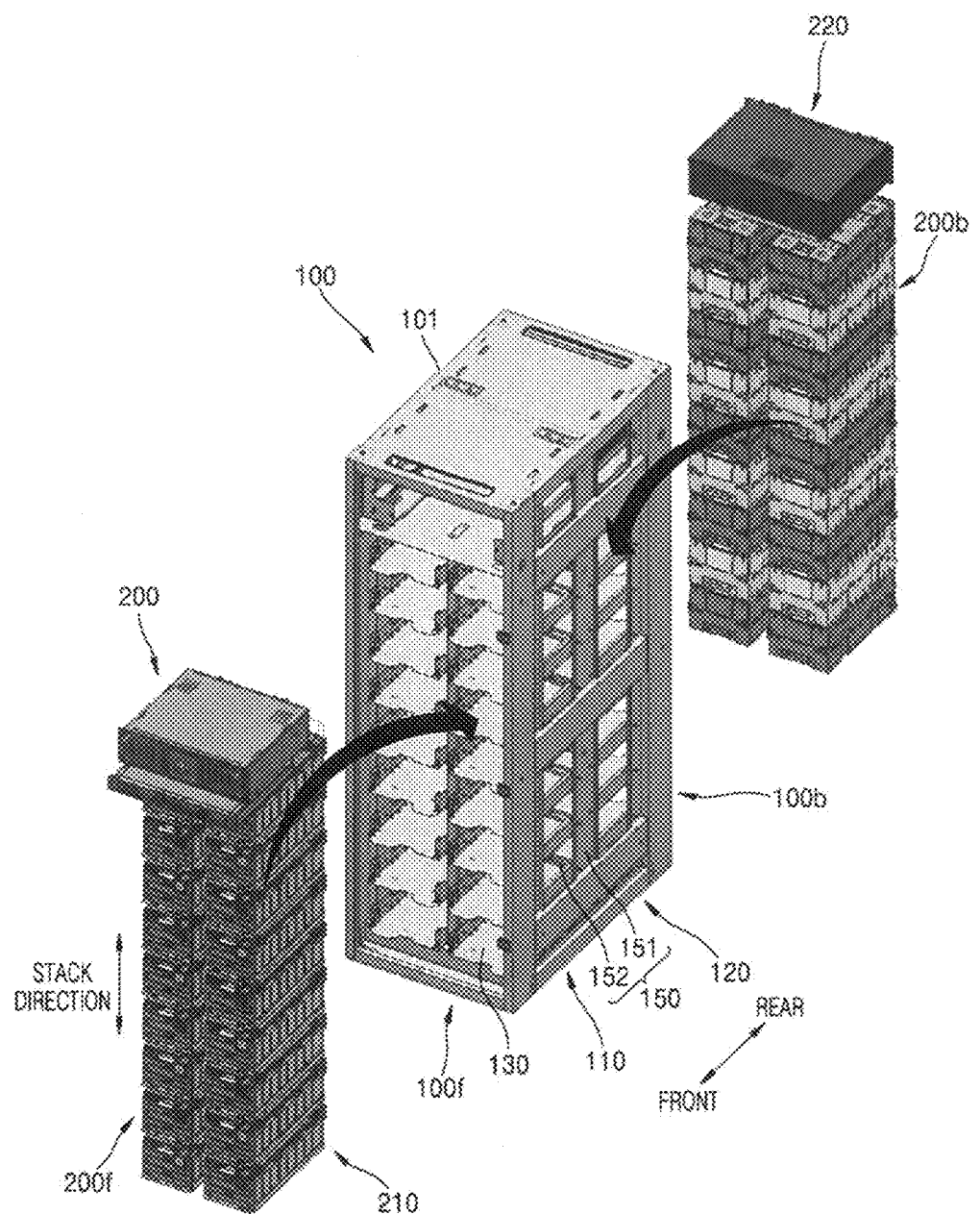
FIG. 1 is an exploded perspective view of a battery assembly according to an embodiment.
Figure 2:
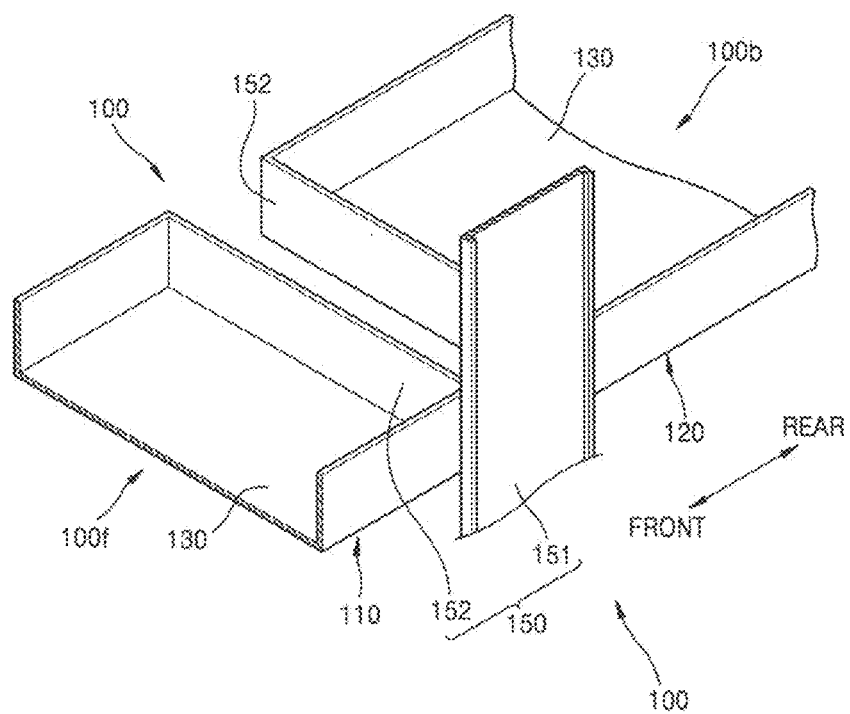
FIG. 2 is a partial perspective view of a rack housing of the battery assembly of FIG. 1.
Figure 3:
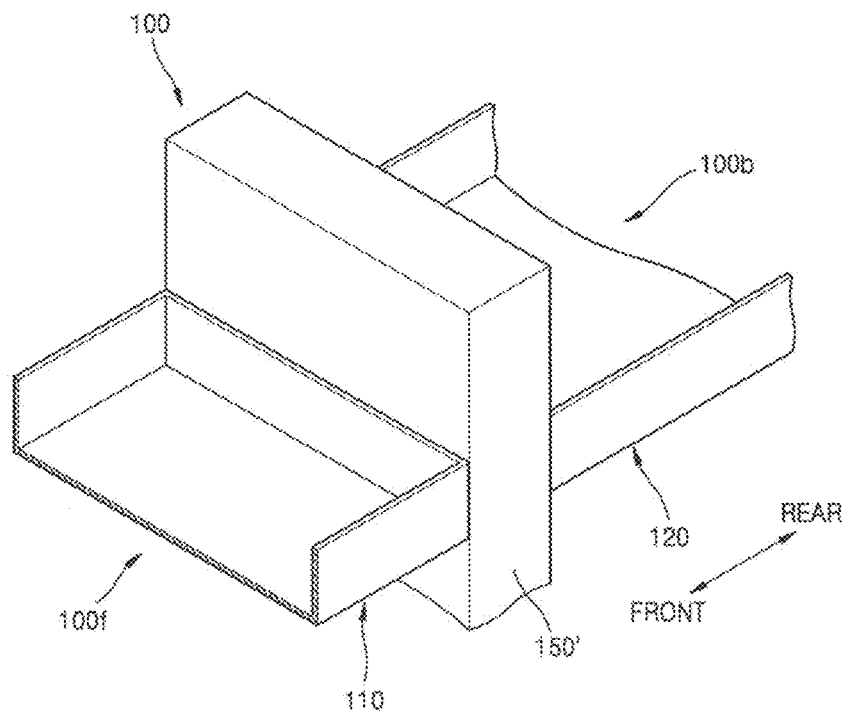
FIG. 3 is a partial perspective view of a rack housing of a battery assembly; according to another embodiment.

FIG. 1 is an exploded perspective view of a battery assembly according to an embodiment. FIG. 2 is a partial perspective view of a rack housing of the battery assembly of FIG. 1. FIG. 3 is a partial perspective view of a rack housing of a battery assembly, according to another embodiment.

Referring to FIG. 1, a battery assembly according to an embodiment may include a rack housing 100 including a front opening portion 100f and a rear opening portion 100b that open in opposite directions, and a plurality of battery modules 200 accommodated in the rack housing 100.

The rack housing 100 may include dual rack housings that respectively open to front and rear portions in directions opposite to each other, in order to accommodate battery modules 210 of a first group of the battery modules 200 and battery modules 220 of a second group of the battery modules 200, respectively. As will be described later herein, the battery modules 210 of the first group and the battery modules 220 of the second group may be assembled through the front opening portion 100f and the rear opening portion 100b of the rack housing 100, respectively. The battery modules 200 may include the battery modules 210 of the first group and the battery modules 220 of the second group, and technical descriptions of the battery module 200 herein may be applied to the battery modules 210 and 220 of the first and second groups.

The rack housing 100 may include the front opening portion 100f and the rear opening portion 100b. The front opening portion 100f and the rear opening portion 100b are portions for accommodating the battery modules 200 in the rack housing 100, and the front opening portion 100f may accommodate the battery modules 210 of the first group and the rear opening portion 100b may accommodate the battery modules 220 of the second group. The rack housing 100 may accommodate the battery modules 210 and 220 of the first and second groups through the front opening portion 110f and the rear opening portion 100b that are disposed opposite each other, and the battery modules 210 and 220 of the first and second groups may be inserted from front and rear portions through the front opening portion 100f and the rear opening portion 100b, respectively, to be mounted in the rack housing 100. As will be described further later, the battery modules 210 of the first group may be accommodated in the rack housing 100 through the front opening portion 100f, and inserted into the rack housing 100 by sliding backward from the front opening portion 100f. The battery modules 220 of the second group may be accommodated into the rack housing 200 through the rear opening portion 100b, and may be inserted into the rack housing 100 by sliding forward from the rear opening portion 100b.

The rack housing 100 may include a first rack housing 110 for accommodating the battery modules 210 of the first group and a second rack housing 120 for accommodating the battery modules 220 of the second group. In an embodiment, the first and second rack housings 110 and 120 are provided against each other. Here, the first and second rack housings 110 and 120 being against each other denotes that the first rack housing 110 is open toward the front portion such that the battery modules 210 of the first group are accommodated in the first rack housing 110 through the front opening portion 100f, while the second rack housing 120 is open toward the rear portion such that the battery modules 220 of the second group are accommodated in the second rack housing 120 through the rear opening portion 100b.

In an embodiment, the first and second rack housings 110 and 120 are formed integrally with each other. Here, the first and second rack housings 110 and 120 being integrally formed with each other denotes that the first and second rack housings 110 and 120 are not separate from each other unless they are physically damaged. For example, when the first and second rack housings 110 and 120 are separate from each other, functions of the first and second rack housings 110 and 120 may not be performed.

The rack housing 100 may include a frame 101 and a partition device 150 for partitioning the frame 101 as front and rear portions. In addition, the rack housing 100 may further include rack shelves 130 inserted in the frame 101 for supporting the battery modules 200.

Referring to FIGS. 1 and 2, the frame 101 may be partitioned in backward and forward directions by the partition device 150, and, thus, the rack housing 100 is divided into the first rack housing 110 and the second rack housing 120. The partition device 150 may include any type of structure that separates the first rack housing 110 and the second rack housing 120 from each other in order to respectively accommodate the battery modules 210 of the first group and the battery modules 220 of the second group such that the battery modules 110 and 120 of the first and second groups may not physically interfere with each other. For example, the partition device 150 may include a partition plate 151. For example, the partition plate 151 may support a load of the battery modules 200 at a center portion in the frame 101, and may prevent or substantially prevent the rack shelves 130 from sagging downward.

The partition device 150 may include protrusions 152 respectively formed on the rack shelves 130, in order to restrict assembling positions of the battery modules 210 of the first group and the battery modules 220 of the second group that are respectively assembled through the front opening portion 100f and the rear opening portion 100b. The battery modules 210 of the first group and the battery modules 220 of the second group are inserted at allowed assembling positions by the protrusions 152, so as not to move into the assembling positions of the other group and physically interfere with each other. In an embodiment, for example, the protrusions 152 are provided as pairs for restricting the assembling positions of the battery modules 210 and 220 of the first and second groups. Here, since the assembling positions of the battery modules 210 and 220 of the first and second groups may be restricted by the protrusions 152, the partition plate 151 may not restrict the assembling positions of the battery modules 210 and 220 of the first and second groups, but may function as a support for the load from the battery modules 210 and 220 of the first and second groups. In an embodiment, for example, the protrusions 152 may be welded to the partition plate 151.

Referring to FIG. 3, a partition device according to another embodiment may include a partition plate 150'. The partition plate 150' may divide the rack housing 100 into the first rack housing 110 and the second rack housing 120 in the backward and forward directions. As such, assembling positions of the battery modules 210 of the first group assembled through the front opening portion 100f and the battery modules 220 of the second group assembled through the rear opening portion 100b may be separate from each other via the partition plate 150' that partitions them into two regions in the backward and forward directions, and physical interference between the battery modules 210 and 220 of the first and second groups assembled in the rack housing 100 may be prevented or substantially prevented.

Figure 4:
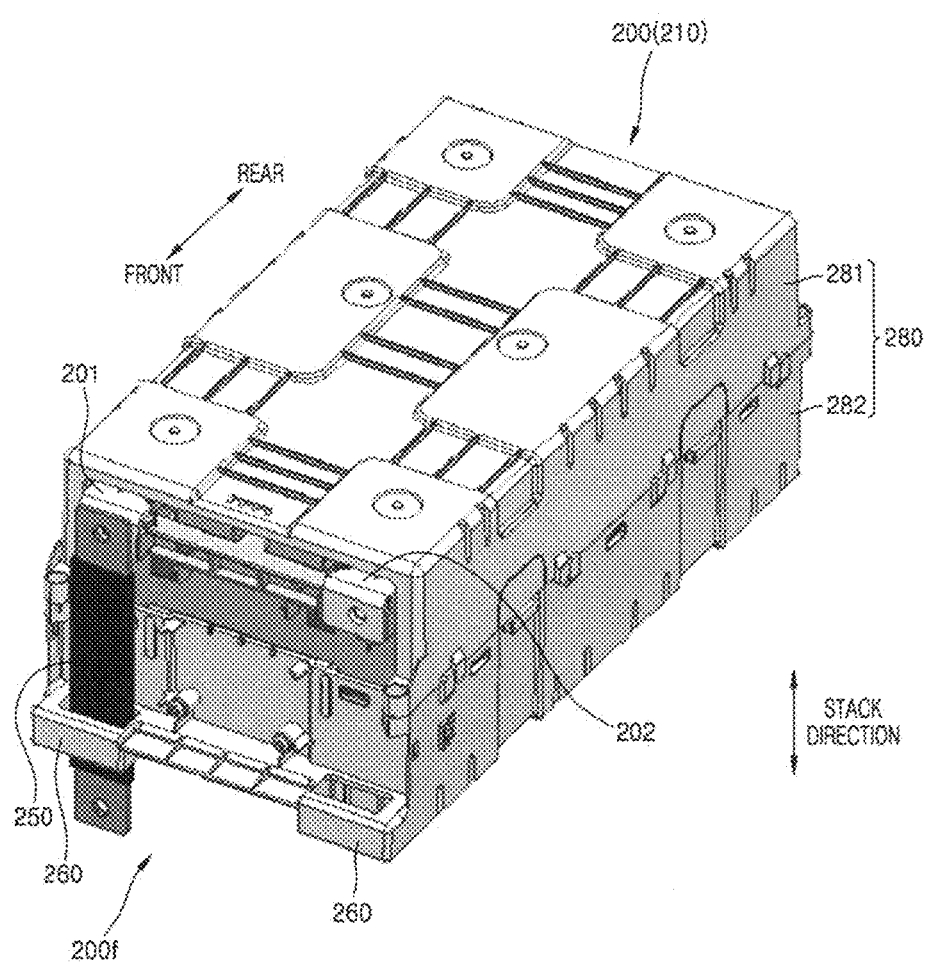
FIG. 4 is a perspective view of a battery module of a first group of battery modules of the battery assembly shown in FIG. 1.
Figure 5:
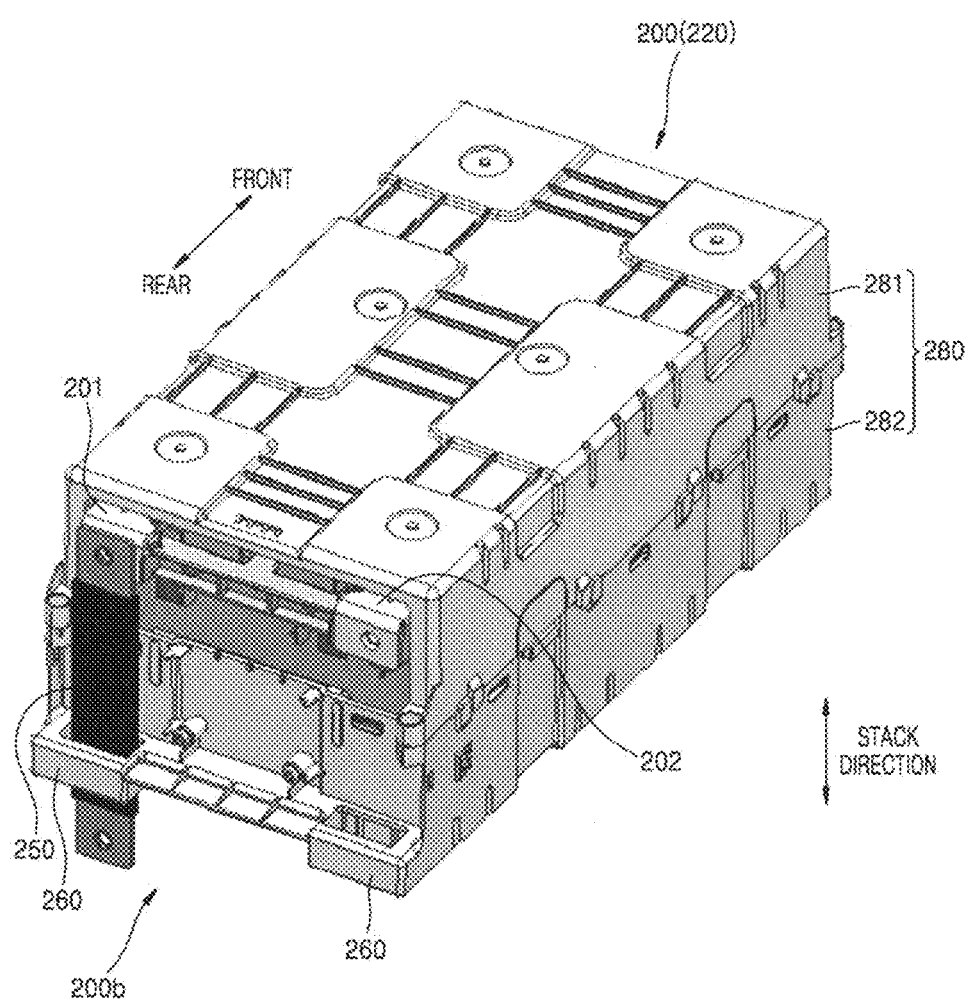
FIG. 5 is a perspective view of a battery module of a second group of battery modules of the battery assembly shown in FIG. 1.

FIG. 4 is a perspective view of the battery modules 210 of the first group of the battery modules 200 shown in FIG. 1; FIG. 5 is a perspective view of the battery modules 220 of the second group of the battery modules 200 shown in FIG. 1; and FIG. 6 is a perspective view illustrating operations of a rotation bound device of the battery modules 210 shown in FIG. 4.

Figure 6:
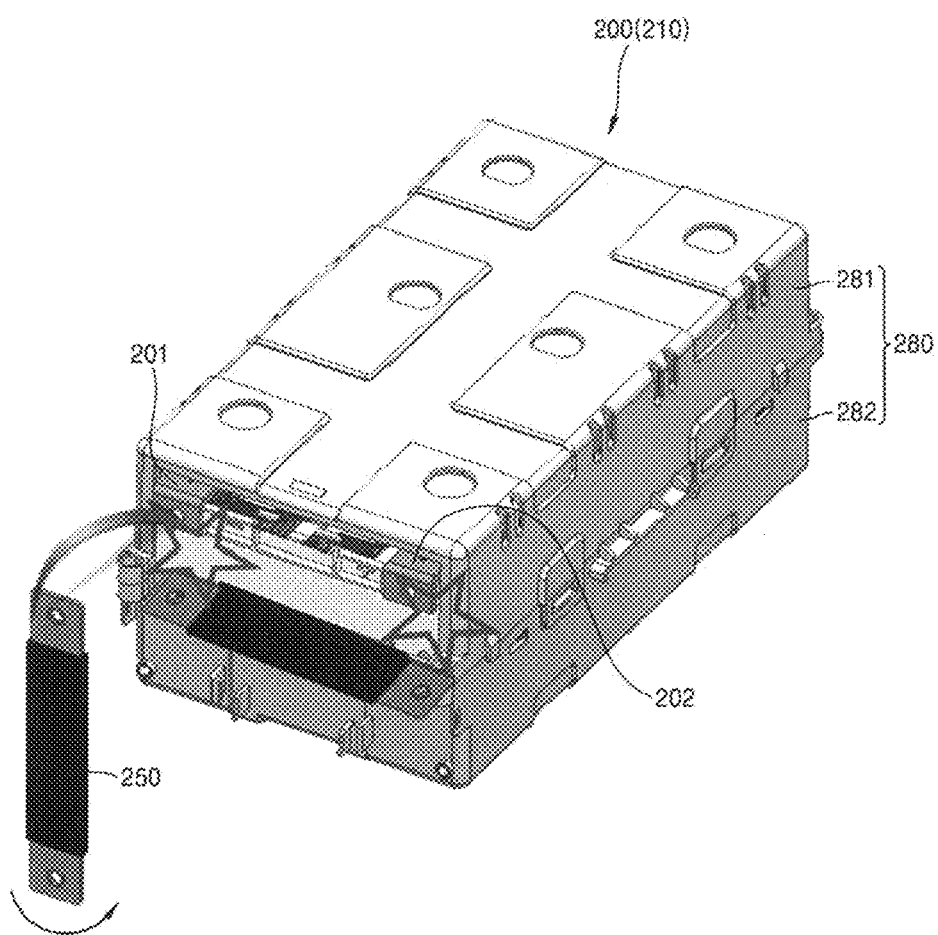
FIG. 6 is a perspective view illustrating operations of a rotation bound device in the battery module of FIG. 4.

Referring to FIGS. 4 to 6, each of the battery modules 200 may have first and second terminals 201 and 202 at a portion (e.g., one exclusive portion) of a front opening portion 200f or a rear opening portion 200b along a lengthwise direction thereof. Having the first and second terminals 201 and 202 at one exclusive portion of the front or rear opening portions 200f and 200b denotes that the first and second terminals 201 and 202 are both formed at the front opening portion 200f of the battery module 200 or at the rear opening portion 200b of the battery module 200. For example, it does not denote that the first terminal 201 is provided at a front surface of the battery module 200 and the second terminal 202 is provided at a rear surface of the battery module 200, or the first terminal 201 is provided at the rear surface of the battery module 200 and the second terminal 202 is provided at the front surface of the battery module 200. That is, in an embodiment, the first and second terminals 201 and 202 are both formed at a same portion of the front opening portion 200f of the battery module 200 or the rear opening portion 200b of the battery module 200.

As described above, the first and second terminals 201 and 202 provided at one exclusive portion of the front opening portion 200f or the rear opening portion 200b of the battery module 200 are exposed through the front opening portion 100f or the rear opening portion 100b of the rack housing 100, and the first and second terminals 201 and 202 exposed through the front or rear opening portion 100f or 100b of the rack housing 100 may be electrically connected to the first and second terminals 201 and 202 of one or more other neighboring battery modules 200.

In the battery modules 210 of the first group, the first and second terminals 201 and 202 are provided at the front opening portion 200f and are exposed through the front opening portion 100f of the rack housing 100. In addition, the first and second terminals 201 and 202 of the neighboring battery modules 200 exposed through the front opening portion 100f are electrically connected to each other, and, accordingly, the neighboring battery modules 200 may be electrically connected to one another in series, in parallel, and/or in a combined manner of the serial and parallel connections. For example, the first terminals 201 or the second terminals 202 of the neighboring battery modules 200 may be connected to each other in parallel, and the first terminal 201 and the second terminal 202 of the neighboring battery modules 200 may be connected to each other in series. In an embodiment, the neighboring battery modules 200 may be connected in series when opposite polarities thereof, e.g., the first terminal 201 and the second terminal 202, are connected to each other.

Similarly, in the battery modules 220 of the second group, the first and second terminals 201 and 202 at the rear opening portion 200b are exposed to outside through the rear opening portion 100b of the rack housing 100. In addition, the first and second terminals 201 and 202 of the neighboring battery modules 220 exposed through the rear opening portion 100b are electrically connected to each other, and accordingly, the neighboring battery modules 220 may be electrically connected to one another in series, in parallel, and/or a combined manner of the serial and parallel connections. In an embodiment, the neighboring battery modules 220 may be connected in series when the opposite polarities thereof, e.g., the first and second terminals 201 and 202 thereof, are connected to each other.

In an embodiment, the neighboring battery modules 200 may be electrically connected to one another via a bus bar 250. For example, the bus bar 250 may connect the first and second terminals 201 and 202 of the neighboring battery modules 200 to one another to electrically connect the battery modules 200. For example, the bus bar 250 may be connected from a battery module 200 of an upper portion to a battery module 200 of a lower portion according to a direction in which the battery modules 200 are stacked. Here, the bus bar 250 may be prevented or substantially prevented from rotating (e.g., arbitrarily rotating) by a rotation bound device 260 of the battery module 200. For example, the bus bar 250 may extend from one battery module 200 to another battery module 200 along the direction in which the battery modules 200 are stacked.

As shown in FIG. 6, if the bus bar 250 connected to a first terminal 201 of one battery module 200 contacts a second terminal 202 of the corresponding battery module 200 due to rotation of the bus bar 250, a short circuit may be generated. In an embodiment, the rotation (e.g., arbitrary rotation) of the bus bar 250 may be restrained by the rotation bound device 260 of the battery module 200.

The battery module 200 may include a plurality of battery cells 300 (see FIG. 7) and a case 280 for accommodating the plurality of battery cells 300. The case 280 may include an upper case 281 and a lower case 282 that are assembled to face each other with the plurality of battery cells 300 interposed therebetween. The first and second terminals 201 and 202 are provided at one exclusive portion of the front opening portion 200f or the rear opening portion 200b of the battery module 200, e.g., at the front opening portion 200f of the battery module 200. The first and second terminals 201 and 202 may be formed at a height that is higher than the lower case 282, and the bus bar 250 may extend to another battery module 200 across the lower case 282 along the direction in which the battery modules 200 are stacked. Here, the rotation bound device 260 may be formed at the lower case 282. That is, the first and second terminals 201 and 202 may be formed at the height that is greater than the lower case 282, and the bus bar 250 connected to one of the first and second terminals 201 and 202 may extend to an adjacent battery module 200 across the lower case 282. Here, the rotation bound device 260 may be provided at the lower case 282 and the bus bar 250 may extend through the rotation bound device 260.

In an embodiment, the rotation bound device 260 may be provided at the front opening portion 200f or the rear opening portion 200b in the lower case 282, through which the bus bar 250 extends. The rotation bound device 260 may be at the front opening portion 200f where the first and second terminals 201 and 202 are formed in the battery modules 210 of the first group, and may be at the rear opening portion 200b where the first and second terminals 201 and 202 are formed in the battery modules 220 of the second group.

In an embodiment, the rotation bound device 260 may include a through hole through which the bus bar 250 is inserted. The bus bar 250 that is inserted through the through hole may not be arbitrarily rotated, and a short circuit occurring due to an unintentional connection between the first and second terminals 201 and 202 in the same battery module 200 may be prevented. For example, the rotation bound device 260 may have the through hole that is wider than a width of the bus bar 250 and narrow enough to prevent or substantially prevent the arbitrary rotation of the bus bar 250.

The bus bar 250 may connect the first terminals 201 and the second terminals 202 of the neighboring battery modules 200 to each other, such as in alternating patterns along the direction in which the battery modules 200 are stacked. The bus bars 250 arranged alternately along the direction in which the battery modules 200 are stacked electrically connect the first and second terminals 201 and 202 of different pairs of battery modules 200 to form serial connections. For example, the bus bar 250 connected to the first terminal 201 of one battery module 200 may be connected to the second terminal 202 of another battery module 200 positioned above in the stack direction of the battery modules 200, and another bus bar 250 connected to the second terminal 202 of one battery module 200 may be connected to the first terminal 201 of another battery module 200 positioned below in the stack direction of the battery modules 200.

Figure 7:
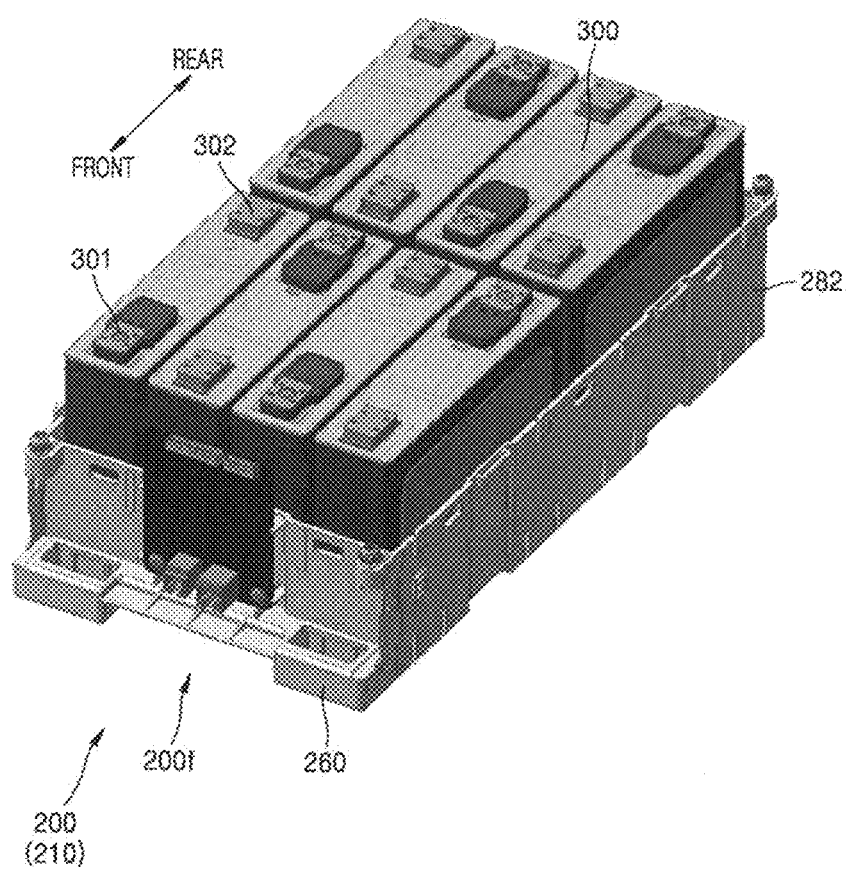
FIGS. 7 and 8 are perspective views illustrating an arrangement structure of battery cells in the battery module of FIG. 4.
Figure 8:
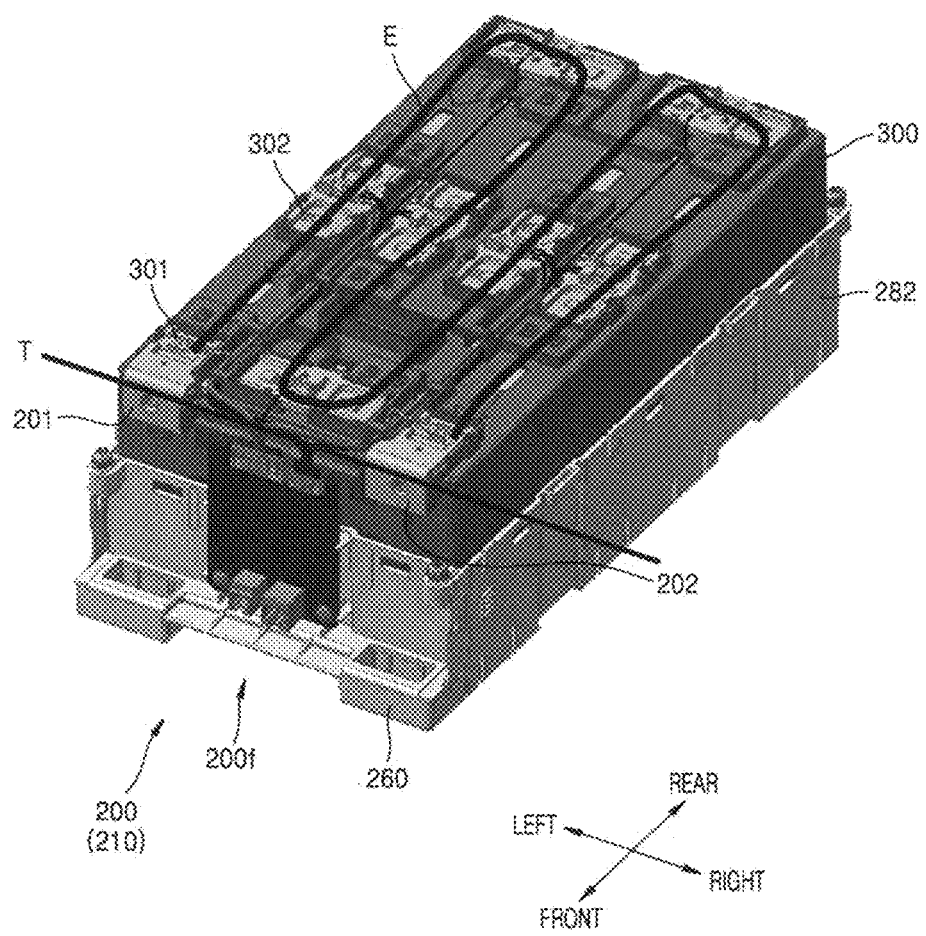

FIGS. 7 and 8 are perspective views illustrating a structure of arranging battery cells 300 in the battery module 200 of FIG. 4.

Referring to FIGS. 7 and 8, the battery module 200 may include a plurality of battery cells 300. For example, each of the battery cells 300 may include first and second electrodes 301 and 302 that are different from each other, and an electrode line E of the battery cell 300 crossing over the first and second electrodes 301 and 302 may extend in back and forth directions. In addition, a terminal line T of the battery module 200 crossing over the first and second terminals 201 and 202 of the battery module 200 may extend in a left-and-right direction that is perpendicular to the back and forth directions. That is, the terminal line T (e.g., left-and-right direction) of the battery module 200 and the electrode line E (e.g., back and forth directions) of the battery cell 300 may cross each other. That is, with respect to the orientation of assembling the battery cells 300 in the battery module 200, the electrode line E (e.g., back and forth directions) of the battery cell 300 may extend crossing the terminal line T (e.g., left-and-right direction) of the battery module 200. For example, the battery cells 300 may be assembled such that the electrode line E (e.g., back and forth directions) of the battery cell 300 may be perpendicular to the terminal line T (e.g., left-and-right direction) of the battery module 200. In addition, by arranging the assembling orientation of the battery cells 300 as described above, both of the first and second terminals 201 and 202 of the battery module 200 may be formed at the front opening portion 200f or the rear opening portion 200b of the battery module 200. The first and second terminals 201 and 202 of the battery module 200 may correspond to the first and second electrodes 301 and 302 of battery cells 300 at first (e.g., front) and last from among the plurality of battery cells 300 that are electrically connected to one another.

The first and second terminals 201 and 202 may be formed at a side of one exclusive opening portion of the front opening portion 200f or the rear opening portion 200b of the battery module 200. For example, in the battery modules 210 of the first group, the first and second terminals 201 and 202 may be formed at the front opening portion 200f of the battery module 200. In an embodiment, the rack housing 100 in which the battery modules 200 are assembled includes the front opening portion 100f and the rear opening portion 100b so as to accommodate the battery modules 210 of the first group assembled through the front opening portion 100f and the battery modules 220 of the second group assembled through the rear opening portion 100b. Here, in the battery modules 210 of the first group, the first and second terminals 201 and 202 are positioned at the front opening portion 200f of the battery module, and in the battery modules 220 of the second group, the first and second terminals 201 and 202 are positioned at the rear opening portion 200b of the battery module 200. The first and second terminals 201 and 202 are positioned at the front or rear opening portion 200f and 200b, and may not be formed on an opposite side to the respective front and rear opening portions 200f and 200b. Then, the bus bar 250 may be connected to the first and second terminals 201 and 202 exposed through the front opening portion 200f or the rear opening portion 200b of the battery module 200. However, if the first and second terminals 201 and 202 of the battery module 200 were formed at opposite front and rear opening portions 200f and 200b respectively, the bus bar 250 may not be connected to the first terminal 210 and the second terminal 220 formed at opposite sides respectively, but would be blocked by the rack housing 100.

Figure 9:
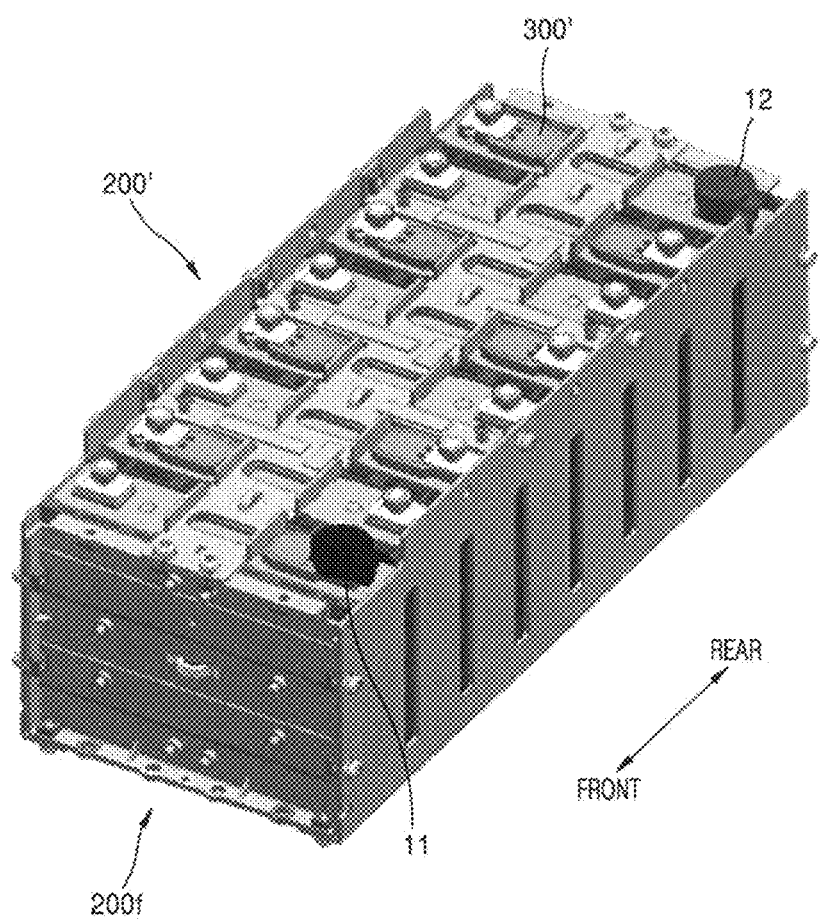
FIG. 9 is a diagram of a battery module according to a comparative example.

FIG. 9 is a diagram of a battery module 200' according to a comparative example.

Referring to FIG. 9, the battery module 200' includes a plurality of battery cells 300'. Here, first and second terminals 11 and 12 of the battery module 200' are formed at front and rear portions of the battery module 200'.

When the battery module 200' as illustrated in FIG. 9 is assembled to the rack housing 100, the bus bar 250 may be connected to the first terminal 11 of the battery module 200', which is placed at the opening portion (front opening portion 200f), but the bus bar 250 may not be connected to the second terminal 12 of the battery module 200' placed opposite the front opening portion 200f. Therefore, the first and second terminals 201 and 202 of the battery module 200 according to the above-described embodiment may be positioned at the front opening portion 200f or the rear opening portion 200b of the battery module 200, and, accordingly, an orientation of the battery cells 300 assembled in the battery module 200 may have an arrangement as described above.

Referring to FIG. 1, with respect to the rack housing 100 having the structure that is integrally formed, the battery modules 200 may be loaded in dual rows along the back and forth direction through the front opening portion 100f and the rear opening portion 100b. That is, the battery modules 210 of the first group assembled through the front opening portion 100f and the battery modules 220 of the second group assembled through the rear opening portion 100b may be inserted while sliding into the rack housing 100 to face each other. The dual rack housing 100 is different from a single rack housing structure that has only one opening portion at the front or rear portion thereof.

The rack housing 100 having the dual structure may have the front opening portion 100f and the rear opening portion 100b at the front and rear portions thereof, respectively, and may accommodate the battery modules 200 in dual rows (e.g., the battery modules 210 of the first group and the battery modules 220 of the second group) that are assembled to face each other. In an embodiment, the rack housing 100 may accommodate the battery modules 200 in dual rows (e.g., the battery modules 210 of the first group and the battery modules 220 of the second group) through the integrally formed structure.

The rack housing 100 has the front opening portion 100f and the rear opening portion 100b in directions opposite to each other, at the front and rear portions thereof, respectively. The front opening portion 100f and the rear opening portion 100b allow the bus bar 250 to be assembled to the first and second terminals 201 and 202 of the battery module 200. In an embodiment, the front opening portion 100f allows the bus bar 250 to be connected to the first and second terminals 201 and 202 formed on the battery module 210 of the first group. In addition, the rear opening portion 100b allows the bus bar 250 to be connected to the first and second terminals 201 and 202 formed on the battery module 220 of the second group.

The rack housing 100 may include the first rack housing 110 for accommodating the battery modules 210 of the first group and the second rack housing 120 for accommodating the battery modules 220 of the second group. Here, the first and second rack housings 110 and 120 are respectively formed in the front portion and the rear portion of the rack housing 100, and may be integrally formed with each other. The first and second rack housings 110 and 120 are respectively formed in the front portion and the rear portion of the rack housing 100 along the back and forth direction in which the battery modules 200 are assembled. In an embodiment, an opening portion is not provided between the first and second rack housings 110 and 120. That is, an opening portion is not provided between the first and second rack housings 110 and 120, e.g., at a center portion of the rack housing 100 in the back and forth direction. Accordingly, it is difficult to perform operations on the rear surface of the battery module 210 of the first group and on the front surface of the battery module 220 of the second group, after the battery modules 200 are accommodated in the rack housing 100. In an embodiment, since terminals are not formed on the rear surface of the battery module 210 of the first group and are not formed on the front surface of the battery module 220 of the second group, a wiring operation for connecting the terminals 201 and 202 of the neighboring battery modules 200 is easily performed with exposed terminals 201 and 202.

The rack housing 100 has the front opening portion 100f and the rear opening portion 100b in directions opposite to each other at the front and rear portions thereof, respectively. Here, the battery modules 200 may be assembled through the front and rear opening portions 100f and 100b, and an operation of connecting terminals of the battery modules 200 may be performed. Thus, an operation space may be provided at the front and rear portions of the rack housing 100. For example, the operation space may be provided in front of the front opening portion 100f and behind the rear opening portion 100b. The rack housing 100 may lean against an indoor wall (not shown), but the front and rear surfaces of the rack housing 100 may be separate from the indoor wall in order to ensure the operation space at the front and rear portions of the rack housing 100. In an embodiment, there is no opening portion in side surfaces of the rack housing 100 and there is no need to secure an operation space in the side surfaces, such that the side surface of the rack housing 100 may lean against the indoor wall, for example.

According to one or more embodiments, the battery modules may be accommodated in opposite sides, e.g., the front surface and the rear surface, of the rack housing, and one rack housing may accommodate the plurality of battery modules via the dual rack structure. For example, when the rack housing according to one or more embodiments is compared with a single rack housing structure accommodating the battery modules through one opening portion, a higher number of battery modules may be accommodated in a same rack housing. By accommodating the plurality of battery modules in the relatively small number of rack housings, unit costs for manufacturing a battery assembly in which the plurality of battery modules are loaded may be reduced.

According to another aspect, when the battery modules loaded in the rack housing are electrically connected to one another, short circuits may be prevented or substantially prevented. For example, the plurality of battery modules loaded in the rack housing are electrically connected to one another via the bus bar, and arbitrary rotation of the bus bar may be prevented or substantially prevented by the rotation bound device that may prevent the short circuit due to the rotation of the bus bar.

It is to be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. A battery assembly comprising:
a rack housing comprising a front opening portion and a rear opening portion open in opposite directions; and
a plurality of battery modules accommodated in the rack housing,
wherein each of the plurality of battery modules comprises a first terminal and a second terminal of opposite polarities, both the first terminal and the second terminal of battery modules of a first group of the plurality of battery modules are arranged at the front opening portion, and both the first terminal and the second terminal of battery modules of a second group of the plurality of battery modules are arranged at the rear opening portion.

2. The battery assembly of claim 1, wherein both the first terminal and the second terminal of each respective battery module of the plurality of battery modules are arranged at a same portion of the front opening portion or the rear opening portion.

3. The battery assembly of claim 1, wherein a bus bar for electrically connecting neighboring battery modules of the plurality of battery modules is connected to one of the first terminal or the second terminal of each of the neighboring battery modules.

4. The battery assembly of claim 3, wherein each of the plurality of battery modules comprises a rotation bound device to restrain rotation of the bus bar.

5. The battery assembly of claim 4, wherein the rotation bound device is arranged at the same portion of the front opening portion or the rear opening portion, at which the first and second terminals are arranged.

6. The battery assembly of claim 4, wherein the rotation bound device comprises a through hole to receive the bus bar.

7. The battery assembly of claim 4, wherein, in each of the plurality of battery modules, the first terminal and the second terminal are arranged at an upper portion, and the rotation bound device is at a lower portion.

8. The battery assembly of claim 7, wherein the bus bar extends in a direction in which battery modules of the plurality of battery modules are stacked.

9. The battery assembly of claim 1, wherein the rack housing comprises:
a first rack housing accommodating the battery modules of the first group; and
a second rack housing accommodating the battery modules of the second group.

10. The battery assembly of claim 9, wherein the first rack housing accommodates the battery modules of the first group through the front opening portion, and the second rack housing accommodates the battery modules of the second group through the rear opening portion.

11. The battery assembly of claim 9, wherein the first rack housing and the second rack housing are integrally formed with each other.

12. The battery assembly of claim 1, wherein the rack housing comprises:
a frame; and
a partition device partitioning the frame in a backward and forward direction.

13. The battery assembly of claim 12, wherein the partition device restricts assembling locations of the battery modules of the first group and the battery modules of the second group, the battery modules of the first group and the battery modules of the second group being assembled respectively through the front opening portion and the rear opening portion.

14. The battery assembly of claim 12, wherein the rack housing further comprises rack shelves within the frame to support the plurality of battery modules.

15. The battery assembly of claim 1, wherein each of the plurality of battery modules comprises a plurality of battery cells.

16. The battery assembly of claim 15, wherein each of the plurality of battery cells comprises a first electrode and a second electrode having opposite polarities from each other, and wherein a terminal line connecting the first and second terminals to each other and an electrode line connecting the first and second electrodes to each other extend to cross each other.

17. The battery assembly of claim 16, wherein, in each of the plurality of battery modules, both the first terminal and the second terminal are arranged at a same portion of the front opening portion or the rear opening portion.

18. The battery assembly of claim 4, wherein the rotation bound device of a respective battery module of the plurality of battery modules is arranged between and spaced apart from the one of the first terminal or the second terminal of one of the neighboring battery modules to which the bus bar is connected and the one of the first terminal or the second terminal of another one of the neighboring battery modules to which the bus bar is connected.

19. The battery assembly of claim 6, wherein the bus bar is insertable through the through hole.

20. The battery assembly of claim 12, wherein the partition device extends between the battery modules of the first group and the battery modules of the second group.

* * * * *